July 28, 1964

H. A. IAMS 3,142,760

LASER IMAGE AMPLIFIER

Filed Nov. 20, 1961

INVENTOR.
HARLEY A. IAMS,
BY John M. Koch
ATTORNEY.

一
3,142,760
LASER IMAGE AMPLIFIER
Harley A. Iams, Los Angeles, Calif., assignor to Hughes Aircraft Company, Culver City, Calif., a corporation of Delaware
Filed Nov. 20, 1961, Ser. No. 153,371
2 Claims. (Cl. 250—213)

This invention relates to an amplifier designed to amplify optical images by the use of an optical maser or laser.

Optical images are often produced by the use of electron tubes with fluorescent screens in connection with television, image converters, printing, engraving, and the like. Existing methods of generating and projecting very bright transient optical images for such applications depend largely upon the light generated when electrons strike a cathodoluminescent material. In such existing methods, the power input to the television picture tube, image tube, or other image device is limited to a few watts or a few tens of watts by the finite current from the electron source, the requirement for focusing and the voltage limitation set by breakdown or generation of X rays. Furthermore, the power in the light output from such systems is even less, because the fluorescent screen, for example, employed is less than 100% efficient.

Accordingly, it is an object of this invention to provide an optical image amplifier capable of employing high power input and of producing increased light output.

Additional objects will become aparent from the following description which is given primarily for purposes of illustration and not limitation.

Stated in general terms, the objects of this invention are attained by incorporating an optical maser or laser in the optical image display system. As an illustration of the invention an image tube will be discussed. As in the prior art, an optical lens is employed to focus an optical image upon a photocathode. The photocathode converts the optical image into an electron image, and an electron lense is used to focus the electron image. The invention comprises a surface of laser material upon which the electron image is focused, a volume of laser material in which it is amplifier, and means for "pumping" the assembly. The electron image generates fluorescence in the laser material as a result of electron bombardment of the laser material. A pumping light source is employed with the laser material to excite it and amplify the fluorescence generated therein by the electron image. An amplified optical image of high light intensity is thus produced. This optical image can be projected upon a screen for viewing with the aid of a projection lens.

Figure 1:
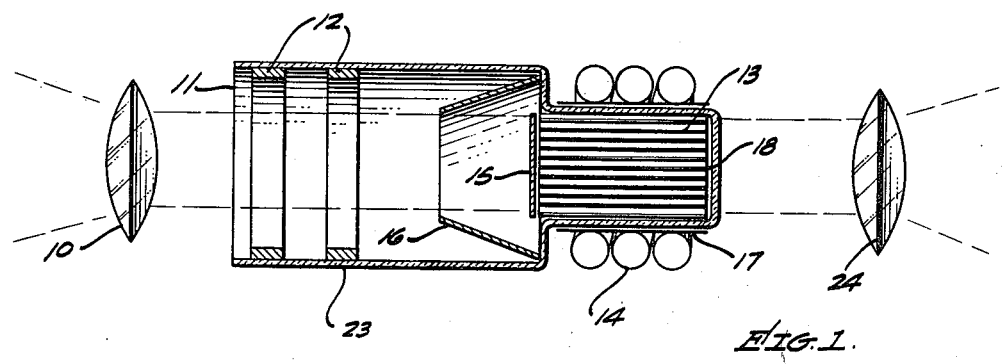
Figure 2:
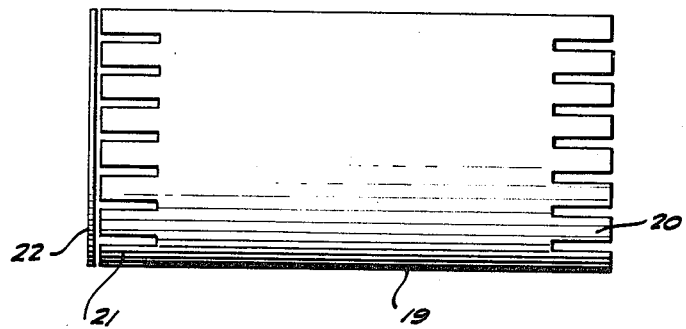

A more detailed description of a specific embodiment of my invention is given below with reference to the appended drawing wherein:

FIG. 1 is a schematic elevational view in section showing an image amplifier made up of a bundle of ruby rods or fibers in combination with an image tube containing electron lenses and an anode and auxiliary optical lenses; and FIG. 2 is an elevational sectional view showing a ruby slug with scored ends as laser material instead of a bundle of ruby fibers.

The scene to be amplified by the apparatus of FIG. 1 is focused by an optical lens 10 upon a photocathode 11 to produce a corresponding electron image. The resulting electron image is focused by one or more electron lenses 12 upon a bundle 13 of ruby laser material rods or fibers. These fibers are chosen in size and number so that one or more of them is employed for each picture element. The fibers 13 are irradiated by a pumping light source 14 in the form of a spiral flash tube. Fluorescence from the electron bombardment of the bundle 13 of ruby fibers causes light in each of the fibers and this light is amplified by laser action produced as a result of the excitation of the ruby fibers by the pumping light source.

Light produced in ruby fibers 13 preferably should be shaded from transmission to photocathode 11. In addition, a reflecting surface should be applied to the input end of the bundle 13 of the ruby fibers adjacent the photocathode 11 for the purpose of causing the ruby laser material to produce stimulated emission. Accordingly, an opaque coating 15, preferably an aluminum film, is applied to the electron image input end of the bundle 13 of ruby fibers. The electrons in the electron image are accelerated to 10,000 volts, or more, by the use of a frusto-conical anode 16, so that they gain sufficient energy to pass through the aluminum film 15.

If desired, an additional thin layer of a phosphor which will emit red light, or which will emit ultraviolet light to excite fluorescence in the ruby, can be applied to the electron image input end of the bundle of fibers 13 before the aluminum film 15 is applied. The function of this layer of phosphor is to enhance the emission of light at a wavelength of 6943 A., which is the wavelength amplified by ruby laser material during stimulated emission. In view of the fact that it is desired to amplify the optical image rather than light from the pumping source 14, a generally cylindrical optical filter 17 is mounted around the ruby fibers 13 to remove light of 6943 A. wavelength from the pumping light generated by light source 14. Projection lens 24 serves to project an optical image of high light intensity upon a viewing screen, for example.

It will be apparent that laser materials other than ruby can be used for the image amplifier. When a bundle of ruby rods or fibers 13 is employed, as described above, interaction between different fibers can be minimized by various methods. For example, each ruby fiber can be coated with a layer having a lower refractive index than ruby, before the fibers are assembled into a bundle 13. The phenomenon is similar to that observed in fiber optics.

In situations where ruby fibers 13 can be made quite long, there is sufficient amplification of the fluorescence generated therein by the electron image, while passing the light once through the bundle of fibers. However, in situations where it is inconvenient to employ such long ruby fibers, the length thereof can be reduced, and the pumping power from light source 14 also can be reduced, if regeneration is employed in the bundle of ruby fibers 13. Such regeneration can be brought about by coating the output end 18 of the bundle 13 of ruby fibers with a partly reflecting coat of silver, or other suitable reflecting metal coating.

When the optical image to be amplified is a character, or pattern, in which shades of gray are not needed, the reflection produced by the partly reflecting coat of metal at the output end 18, of the ruby fibers 13 can be made sufficiently high to cause the ruby fibers to be stimulated above their threshold level, and thus trigger them into oscillation by stimulated emission of light. In this situation pumping light source 14 is pulsed to minimize the probability that all the ruby fibers 13 will be excited in time by stray light, causing all of them to emit.

Instead of a bundle of ruby fibers 13, a solid slug of ruby 19, shown in FIG. 2, can be used where an especially sharp image is not imperative. When such a solid body of ruby laser material 19 is employed, filaments of laser material, rather than the entire body of material, may be excited. Such filaments of excited laser material operate more or less independently in the solid body of ruby 19. The ends of ruby slug 19 preferably are scored or grooved as shown at 20 and 21 to intercept the widely divergent rays. The scoring can be in the form of a set of parallel vertical grooves intersecting a set of parallel horizontal grooves, or other suitable pattern. The grooves formed by scoring the ends at 20 and 21 are filled with a suitable light absorbing material. An opaque aluminum film 22 is employed at the input end of ruby slug 19, as shown, for the reasons given above in employing the aluminum film 15 with the apparatus shown in FIG. 1. The photocathode 11, electron lenses 12, anode 16 and the body or bundle of laser material can be mounted in an image tube 23 as indicated in FIG. 1.

Instead of using the invention in an image tube of the type described above in connection with the apparatus of FIG. 1, it can be used in other display devices, such as cathode ray tubes, character forming tubes or other suitable devices. With hundreds of watts or kilowatts of light formed into an image or pattern, the device of this invention can be used for television projection, printing, or even the erosion of metal to make circuit boards or intricate shapes.

Obviously many other modifications and variations of the present invention are possible in the light of the above teachings. It is therefore to be understood that within the scope of the appended claims the invention can be practised otherwise than as specifically described.

What is claimed is:

1. An optical image amplifier comprising optical lens means for focusing an optical image upon a photocathode, photocathode means cooperatively associated with the optical lens means for converting optical images focused thereon into an electron image, electron lens means cooperatively associated with the photocathode means for focusing the electron image upon a laser material surface, a body of laser material having a surface for receiving thereon a focused electron image from the electron lens means, and pumping light means cooperatively associated with the laser material for exciting the laser material and amplifying fluorescence generated therein by the electron image.

2. An optical image amplifier according to claim 1, wherein said body of laser material consists of a plurality of fibers of laser material positioned in parallel relationship with each other.

References Cited in the file of this patent

UNITED STATES PATENTS

| 2,877,368 | Sheldon | Mar. 10, 1959 |
| 2,960,416 | Reed | Nov. 15, 1960 |
| 2,983,835 | Frey | May 9, 1961 |

OTHER REFERENCES

Light Amplifier Extends Spectrum, Electronics, July 22, 1960, vol. 33, page 43.